US006658478B1

(12) United States Patent
Singhal et al.

(10) Patent No.: US 6,658,478 B1
(45) Date of Patent: Dec. 2, 2003

(54) DATA STORAGE SYSTEM

(75) Inventors: Ashok Singhal, Redwood City, CA (US); Jeffrey A. Price, Pleasanton, CA (US); David J. Broniarczyk, Mountain View, CA (US); George C. Cameron, Capitola, CA (US)

(73) Assignee: 3PARdata, Inc., Fremont, CA (US)

( * ) Notice: Subject to any disclaimer, the term of this patent is extended or adjusted under 35 U.S.C. 154(b) by 166 days.

(21) Appl. No.: 09/633,088

(22) Filed: Aug. 4, 2000

(51) Int. Cl.[7] .............................................. G06F 15/16
(52) U.S. Cl. ........................ 709/232; 709/239; 710/38; 710/316
(58) Field of Search ................................ 709/232, 239; 710/38, 316; 370/228

(56) References Cited

U.S. PATENT DOCUMENTS 5,272,675 A  * 12/1993  Kobayashi .................. 365/221
5,808,607 A  *  9/1998  Brady et al. ................. 345/327
5,928,351 A  *  7/1999  Horie et al. .................. 712/11
5,940,612 A  *  8/1999  Brady et al. ................. 709/103

OTHER PUBLICATIONS

Clustered Failover Solution (Protecting Your Environment), Network Appliance—Products—Filers, Feb. 11, 2000.
Design of the TruCluster Multicomputer System for the Digital UNIX Environment, Cardoza et al., Digital Technical Journal, vol. 8, No. 1, pp. 5–17 (1996).
Symmetrix 3000 and 5000 ICDA Product Description Guide, EMC Corporation (1997).

* cited by examiner

Primary Examiner—Frantz Jean
(74) Attorney, Agent, or Firm—Patent Law Group LLP; David C. Hsia (57) ABSTRACT

A data storage system includes a plurality of nodes for providing access to a data storage facility. Each node has a computer-memory complex to provide general purpose computing for the node, a node controller to control data transfers through the respective node, and a cluster memory to buffer data for the data transfers. A plurality of communication paths interconnect the nodes, with a separate communication path provided for each two nodes of the data storage system.

32 Claims, 8 Drawing Sheets

DATA STORAGE SYSTEM

TECHNICAL FIELD OF THE INVENTION

The present invention relates generally to the field of data storage and, more particularly, to a data storage system.

BACKGROUND OF THE INVENTION

In the context of computer systems, enterprise storage architectures provide mass electronic storage of large amounts of data and information. The frenetic pace of technological advances in computing and networking infrastructure—combined with the rapid, large-scale sociological changes in the way the way these technologies are used—has driven the transformation of enterprise storage architectures faster than perhaps any other aspect of computer systems. This has resulted in a variety of different storage architectures, such as, for example, direct attached JBODs (Just a Bunch Of Disks), SAN (Storage Area Network) attached JBODs, host adapter RAID (Redundant Array of Inexpensive/Independent Disks) controllers, external RAID controllers, redundant external RAID controllers, and NAS (Network Attached Storage) Each of these storage architectures may serve a special niche, and thus may differ significantly in terms of functionality, performance, cost, availability, scalability and manageability.

Typically, any given business has a variety of data storage needs, such as, for example, database storage, home directories, shared application executables, and data warehouse storage. In general, no single one of the previously developed architectures is capable of addressing all of the storage needs of a business. Thus, businesses are forced to use a number of different architectures to provide the functionality and performance which are desired. This results in fragmented data storage which limits the sharing of data resources, erects static boundaries in data, necessitates redundant training for staff, and requires additional management resources. For example, excess storage space in one type of architecture generally cannot be used to ease congestion in an architecture of another type. Nor can storage architectures of different types be used as backup/redundancy for each other.

Previously developed data storage architectures suffer in other respects as well. For example, data storage architectures typically use computer-memory complexes (e.g., central processing unit (CPU) and associated memory) to control access into the devices which actually store data (e.g., disk drives). In previously developed architectures, all data transfers are routed through the internal buses of the computer-memory complexes. Because these internal buses generally have relatively low bandwidth, bulk data transfers significantly slow the operation of the computer-memory complexes which, in turn, negatively impacts the performance of the overall architectures.

Enterprise architectures may utilize disk storage systems to provide relatively inexpensive, non-volatile storage. Disk storage systems have a number of problems. These problems include the following. Disk systems are prone to failure due to their mechanical nature and the inherent wear-and-tear associated with operation. Accesses (i.e., reads and writes) into disk systems are relatively slow, again due to their mechanical nature. Furthermore, disk storage systems have relatively low bandwidth for data transfer because the effective bandwidth is limited by "platter speed" (i.e., the rate at which data bits move under a disk head).

Various efforts have been made to reduce the problems associated with disk storage systems. One exemplary system resulting from such efforts employs a "node" to control the access of data/information into a number of disk drives. In such previously developed system, the node stores redundant data (e.g., parity information or a duplicate copy of the data itself) to multiple disk drives so that if one disk drive fails, the redundant data can be used to reconstruct the data. The node includes a main computer system having system memory into which data can be cached to reduce the slow seek time of associated with disk drives. Furthermore, the node may store data across multiple disk drives in a technique known as "striping" so that the effective data storage bandwidth is the aggregate bandwidth of the individual disk drives. In addition, multiple nodes may be used within a system to provide redundancy.

Nonetheless, the previously developed system utilizing a storage node suffers from its own problems. The data storage bandwidth through the node is still relatively narrow due to limitations of the main computer system. The memory for caching data at a node is typically volatile, and hence, data may be lost if the node fails. Furthermore, the node can be a single point of failure for the system—i.e. if the node fails, all of the data on disk drives connected to the node is unavailable. Even if multiple nodes are provided, communication between nodes is typically slow, and thus performance of the system is less than optimal.

SUMMARY OF THE INVENTION

The disadvantages and problems associated with previously developed storage systems and techniques have been substantially reduced or eliminated using the present invention.

Among other things, the present invention provides a high performance, scalable, flexible, cost-effective storage system architecture which is particularly well suited for communication-intensive, highly-available data storage, processing or routing. This architecture is capable of addressing the entire range of a business's storage needs. It is scalable both in storage capacity and performance, including latency, bandwidth, and performance stability in the event of localized congestion or failures. The architecture incorporates redundancy in every component, thus making it highly reliable.

According to an embodiment of the present invention, a data storage system includes a plurality of nodes for providing access to a data storage facility. Each node has a computer-memory complex to provide general purpose computing for the node, a node controller to control data transfers through the respective node, and a cluster memory to buffer data for the data transfers. A plurality of communication paths interconnect the nodes, with a separate communication path provided for each two nodes of the data storage system.

According to another embodiment of the present invention, a data storage system includes a plurality of system boards for providing access to a data storage facility. Each system board has an interface slot to connect the system board to the data storage facility, a computer-memory complex to provide general purpose computing for the system board, a node controller to control data transfers through the system board, and a cache memory to buffer data for the data transfers. A backplane interconnects the system boards and supports a plurality of communication paths for transfer of data between the system boards.

A data storage system in accordance with an embodiment of the present invention includes multiple nodes (e.g., up to eight in one implementation). These nodes provide connections for transferring data and information between and among a number of host devices (e.g., servers) and storage devices (e.g., disk drives). Each node is connected to every other node by a number of communication paths, each of which can be a high-speed link. Each node may include a node controller, a cluster memory, and a computer-memory complex. A technical advantage of the present invention includes providing, at each node, a node controller and cluster memory which are separate from the computer-memory complex. A central processing unit (CPU) in the computer-memory complex performs the control functions, setting up the various addresses and lengths required for the data transfer. The actual transfer of data blocks, however, does not go through the computer-memory complex, but rather through the node controller to/from the cluster memory. Since the amount of data in the control is much smaller that the amount of data in the data blocks, the computer-memory complex is relieved of the burden of most of the data bandwidth. With cluster memory, data/information being transferred through node does not have to be temporarily stored in the computer-memory complex. Thus, by reducing the workload and responsibilities of computer-memory complex, the node controller and cluster memory facilitate and optimize the overall operation of the data storage system and architecture.

Another technical advantage of the present invention includes providing high-speed interconnect links between nodes in the data storage system. Each communication path can be a bi-directional link having high bandwidth to provide rapid transfer of data and information between nodes. Each communication path may provide a low latency communication channel between nodes without the protocol overhead of, for example, transmission control protocol/internet protocol (TCP/IP) or Fibre Channel protocol. This allows very efficient communication between nodes.

Yet another technical advantage of the present invention includes the "mirroring" of data which should be cached. The writing of data into cluster memory at a local node causes the same data to be sent and written into the cluster memory at one or more remote nodes. Thus, if the local node fails, the cached data may be recovered from the remote node. Mirroring can be accomplished with several methods. Under one method, regions of cluster memory at each node are set up so that any write to such a region results in the same data being copied to a remote node's cluster memory. Under another method, a Direct Memory Access (DMA) transfer is set up over a communication path (using an exclusive OR (XOR) engine) from local cluster memory to remote cluster memory.

Still another technical advantage of the present invention includes providing a number of serial connections in addition to the communication paths connecting the nodes of the system and architecture. A separate serial connection is provided for each two nodes. This serial connection is distinct and independent from the communication path which connects the same two nodes. The serial connection provides or supports a "heartbeat" connection between the two respective nodes, thus allowing each of the two nodes to query the other node in order to determine if the other node has failed. This avoids the potential corruption of data due to a "split-brain" problem between the two nodes.

Another technical advantage of the present invention includes a data storage system and architecture which extensively leverages commodity parts with industry-standard interfaces to achieve low costs and to allow for changes as the industry advances and newer parts are introduced. The system and architecture are thus cost-effective and flexible.

Yet another technical advantage of the present invention includes distributing control over the communication paths among a number of nodes in the data storage system and architecture. Thus, there is no single point of failure which would cause the system and architecture to completely fail.

In an embodiment of the present invention, more than two nodes are provided in the data storage system. In the event, that one node fails, the load of that node is distributed across the surviving nodes. Because the work load of the failed node is evenly distributed among the other nodes, none of the remaining nodes will act as a bottleneck in the data storage system.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments for the present invention and their advantages are best understood by referring to FIGS. 1–8 of the drawings. Like numerals are used for like and corresponding parts of the various drawings.

Environment For a Data Storage System

Figure 1:
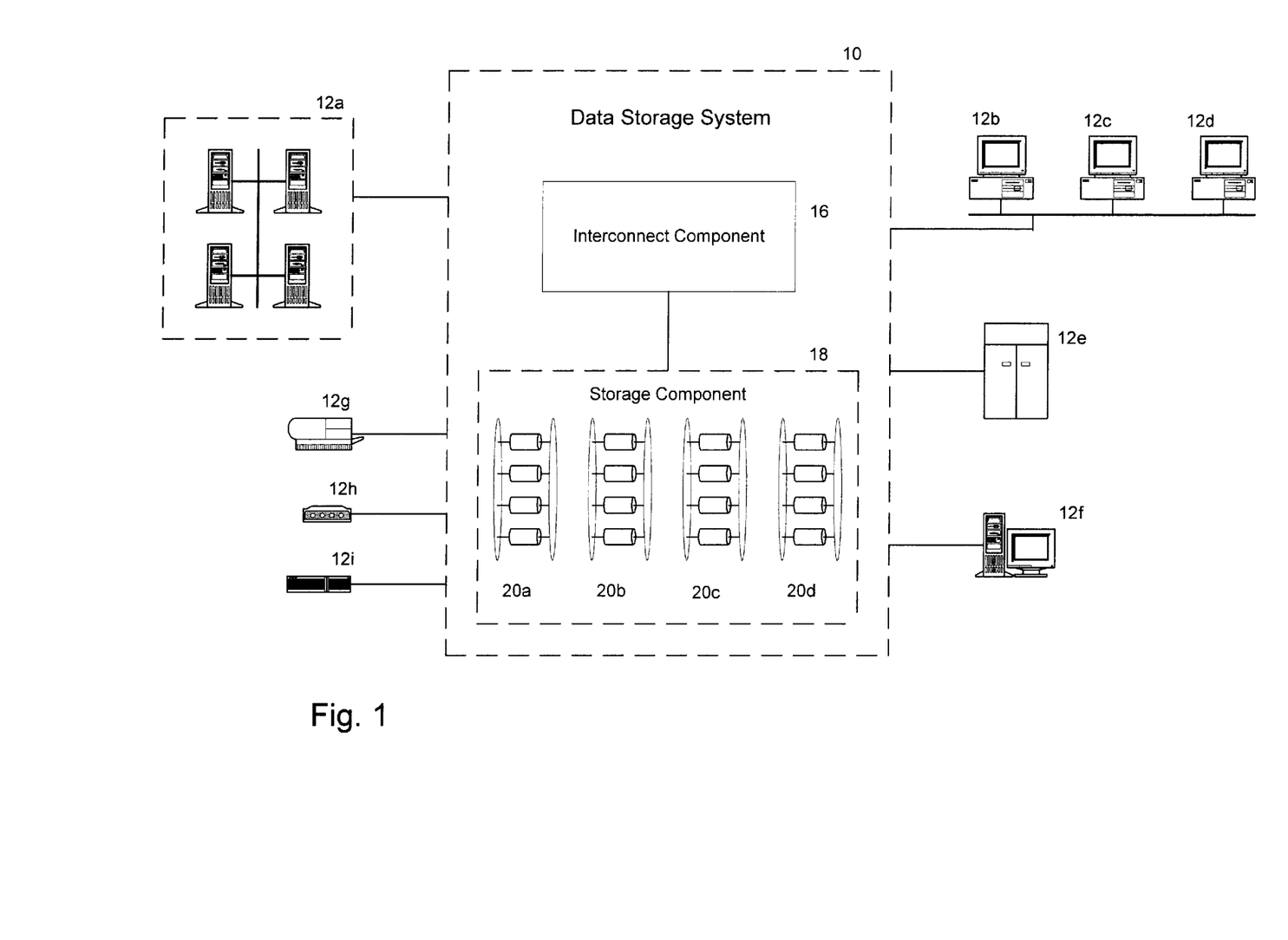
FIG. 1 illustrates an environment in which a data storage system according to an embodiment of the present invention may operate.

FIG. 1 illustrates an environment in which a data storage system 10 according to an embodiment of the present invention may operate. In general, data storage system 10 functions to provide mass storage for data and information routed, generated, manipulated, processed, or otherwise operated upon, by various host devices 12.

As depicted, these host devices 12 can include various processing devices, such as, for example, a server cluster 12a, one or more personal computers 12b, 12c, and 12d, a mainframe 12e, and a server tower 12f. Host devices 12 may also include various peripheral devices, such as, for example, a printer 12g, a modem 12h, and a router 12i. Each of these host devices 12 is connected to data storage system 10. As used herein, the terms "connected" or "coupled" mean any connection or coupling, either direct or indirect, between two or more elements; such connection or coupling can be physical or logical.

Data storage system 10 includes an interconnect component 16 and a storage component 18. Interconnect component 16 generally allows host devices 12 to store and retrieve information from storage component 18. In one embodiment, interconnect component 16 is a modular architecture that is readily scaled from one up to many computer access nodes. Each node may be associated with one or more particular storage devices in storage component 18.

Storage component 18 provides mass storage for data and information. Storage component 18 can be implemented with any suitable mass storage resource, such as tape or disk storage. In one embodiment, as shown, storage component 18 includes a number of storage devices 20, which are separately labeled 20a, 20b, 20c, and 20d. Each storage device 20 may be a JBOD (Just a Bunch of Disks) facility comprising a plurality of disk drives. The disk drives can be mounted in a rack-mountable storage shelf having one or more hot-pluggable disk drive sleds. Each sled may accommodate four disk drives on a pair of fibre channel (FC) connections. The sleds can be configured in one of two possible ways: (1) all sleds on the same redundant FC connections, or (2) half of the sleds on one set of redundant FC connections and the other half of the sleds on another set of redundant FC connections.

As further described herein, data storage system 10 implements or incorporates a scalable architecture particularly well suited for communication-intensive, highly available data storage, processing, or routing. This architecture may be used for a number of applications and can provide a high performance, highly available, scalable, flexible, and cost-effective storage array.

With the scalable architecture of data storage system 10, users (e.g., businesses) may begin with small configurations of data storage initially and later, when necessary, may expand to extremely large configurations. This expansion can be done without bringing down data storage system 10, changing system architectures, or drastically altering the basic infrastructure of the computing environment supported by data storage system 10.

Because of its flexibility and expandability, data storage system 10 can be used to consolidate the diverse storage requirements of a business. This eradicates static boundaries in data, thus enabling data resources to be readily shared and efficiently utilized. Furthermore, this eliminates or substantially reduces the inefficiency associated with training staff and management resources in the use and management of a multitude of data storage architectures.

Interconnect Component

Figure 2:
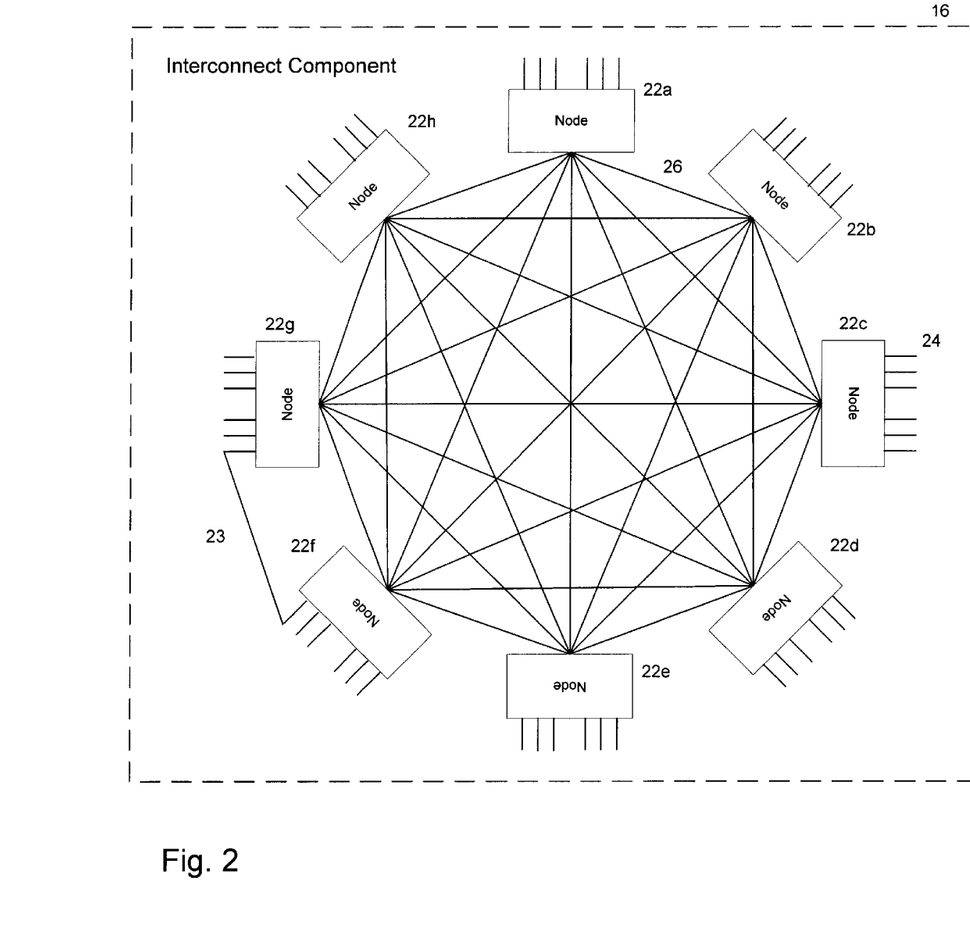
FIG. 2 is a block diagram for an interconnect component, according to an embodiment of the present invention.

FIG. 2 is a block diagram for interconnect component 16, according to an embodiment of the present invention. Interconnect component 16 may include a number of processing nodes 22 connected together by communication paths 26.

As depicted, nodes 22 are separately labeled as 22a, 22b, 22c, 22d, 22e, 22f, 22g, and 22h. Each node 22 generally functions as a point of interface/access for one or more host devices 12 and storage devices 20 (FIG. 1). For this purpose, in one embodiment, each node 22 may include one or more peripheral component interconnect (PCI) slots, each of which supports a respective connection 24. Each connection 24 can connect a host device 12 or a storage device 20. Connections 24 can be small computer system interface (SCSI), fibre channel (FC), fibre channel arbitrated loop (FCAL), Ethernet, Infiniband, or any other suitable connection.

In one embodiment, each host device 12 and storage device 20 has two separate connections 24 to interconnect component 16. In each such pair of connections 24, one connection 24 couples the respective host/storage device to one node 22 and the other connection 24 couples the respective host/storage device to another node 22. One of these two nodes 22 is designated as the "primary node" for the host/storage device, while the other node 22 is designated as the "secondary node." In normal operation, in one embodiment, the primary node performs all accesses to the respective host/storage device; the secondary node takes over only if the primary node fails. In an alternative embodiment, the primary node and the secondary node are simultaneously active to perform accesses. Both embodiments provide redundancy and fault tolerance so that the failure of any particular node 22 does not result in loss of connection to the host devices 12 and storage devices 20 connected to that node 22.

Each node 22 may include its own separate cluster memory (not expressly shown in FIG. 2) Each cluster memory buffers the data and information which is transferred through the respective node 22. Each cluster memory can also serve to buffer the data/information transferred through one or more other nodes 22, as described below in more detail. Thus, taken together, cluster memory in the nodes 22 is used as a cache for reads and writes into storage component 18. Cluster memory can be implemented as any suitable cache memory, for example, synchronous dynamic random access memory (SDRAM).

Communication paths 26 (only one of which is labeled for clarity) connect nodes 22 together. As shown, communication paths 26 connect any given node 22 with every other node 22 of interconnect component 16. That is, for any given two nodes 22, a separate communication path 26 is provided. Each communication path 26 may be implemented as a high-speed, bi-directional link having high bandwidth to provide rapid transfer of data and information between nodes 22. In one embodiment, the links can be two-bytes wide and operate at 266 MHz in each direction, for a total bandwidth of 1,064 MB/s per link. Control of data/information transfers over each communication path 26 is shared between the two respective nodes 22.

Communication paths 26 provide a low latency communication channel between nodes 22 without the protocol overhead of transmission control protocol/internet protocol (TCP/IP) or Fibre Channel protocol. In one embodiment, transfers of data/information over communication paths 26 are covered by an error-correcting code (ECC) that can cover a single bit error in any 64-bit word and can detect any line error on the communication paths 26. Since control of data/information transfers on communications paths 26 is distributed among nodes 22, there is no single point of failure in interconnect component 16 which would cause the component to completely fail.

In addition to communication paths 26, each node 22 may be connected to every other node 22 with a separate link 23. For clarity, only one link 23 is shown. These links 23 can be slower speed connections relative to communication paths 26. In one embodiment, each link 23 can be a serial connection supported by the PCI slots of the respective nodes 22. Each slower-speed link 23 provides or supports a "heartbeat" connection between the two respective nodes 22. As further described herein, such "heartbeat" connection allows each of the two respective nodes 22 to query the other node in order to determine if the other node has failed.

The configuration for interconnect component 16 described herein provides a distributed cluster memory for mass storage. That is, data written into or read out of storage component 18 can be transferred across communication paths 26 and stored at the cluster memory of multiple nodes 22. For writes into storage component 18, data may be temporarily written into the cluster memory of one node 22 and also "mirrored" in the cluster memory of another node 22. That is, the relevant data is automatically sent and replicated in the cluster memory of the other node 22. In one embodiment, cache writes at one node 22 can be copied in every other node 22 of interconnect component 16. This provides multiple copies of the data to be written so that the data is backed up. The writes into multiple cluster memories can occur virtually simultaneously with communication paths 26. This provides significant fault tolerance and redundancy so that data is not lost in the event that one node 22 fails. In addition, for write caching, because data is mirrored on another node 22 as it comes in from a host device 12, an acknowledgement of the write can be returned relatively quickly. This reduces the latency of critical write operations. Furthermore, the large capacity for read caching can significantly improve the hit rate for reads, thereby reducing the effective latency and required bandwidth for reads.

The distributed cluster memory is shared and protected. The distributed cluster memory is shared because, in one embodiment, a respective controller in any node 22 of interconnect component 16 can write into the cluster memory at any other node 22. The cluster memory at any given node 22 is protected from unexpected accesses from other nodes 22 so that hardware or software failures on a remote node do not significantly affect the local node. Distributed cluster memory also allows for scalability in terms of size as well as performance.

In one embodiment for interconnect component 16, each node 22 can be implemented as a system board on which are provided suitable central processing unit (CPU) devices, memory devices, and application specific integrated circuit (ASIC) devices for providing the functionality described herein. These system boards can be connected together on a backplane which supports communication paths 26. Such an embodiment is shown and described below with reference to FIG. 7.

Node

Figure 3:
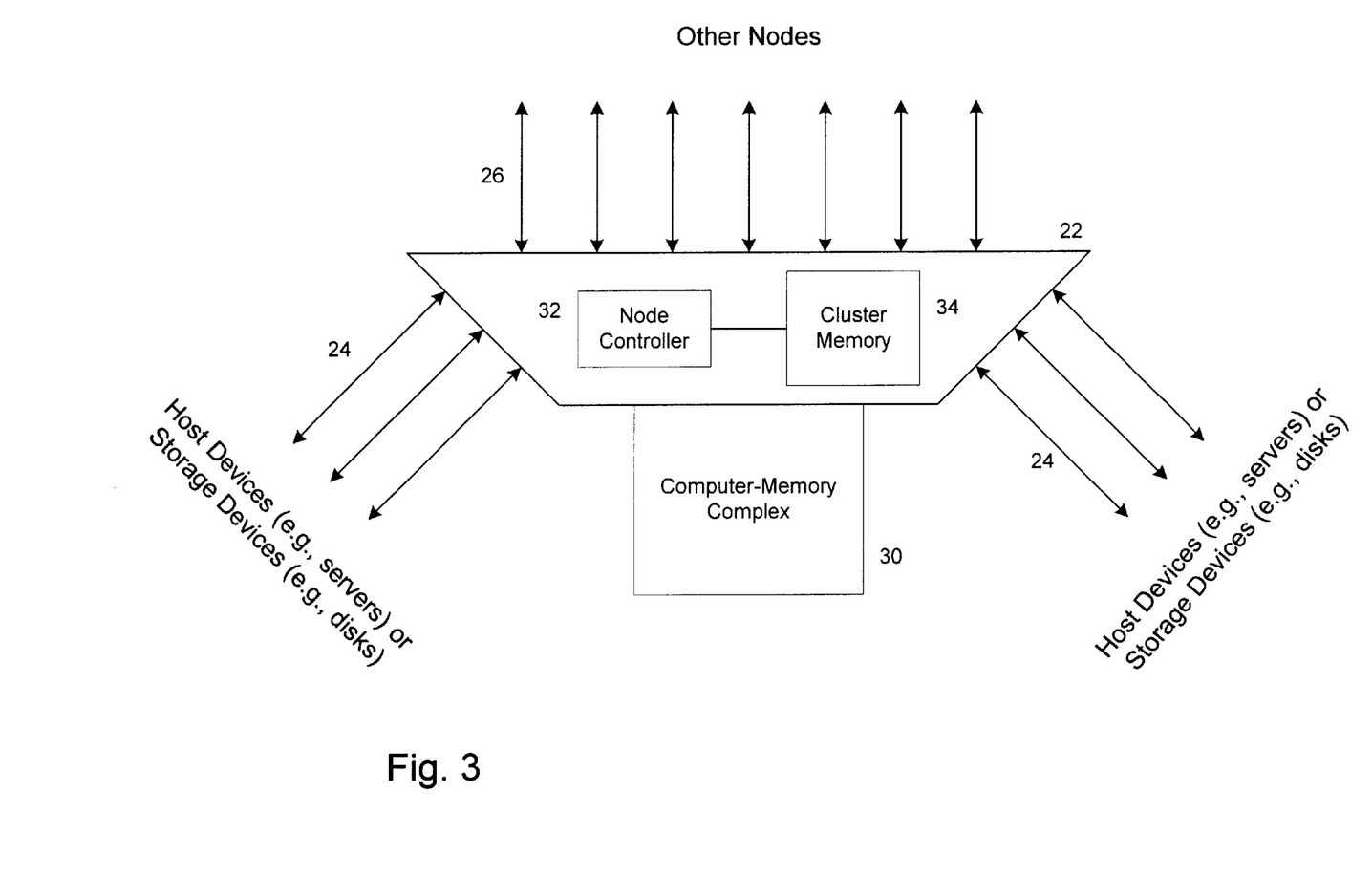
FIG. 3 is a simplified block diagram for a node, according to an embodiment of the present invention.

FIG. 3 is a block diagram of a node 22, according to an embodiment of the present invention. Node 22 supports connections 24 for connecting host devices 12 and storage devices 20, and communication paths 26 for communicating with other nodes 22. As depicted, node 22 can be implemented with a computer-memory complex 30, a node controller 32, and a cluster memory 34.

Computer-memory complex 30 can be a computer system which includes one or more central processing units (CPUs) and associated memory running an independent copy of an operating system. Computer-memory complex 30 functions to support, control, or otherwise manage one or more suitable buses through which data and information can be transferred via connections 24. In one embodiment, each such bus can be a peripheral component interconnect (PCI) bus. Computer-memory complex 30 may also support other functions, such as, for example, a hypertext transport protocol (HTTP) service, a network file system (NFS) service, and a common Internet file system (CIFS) service. An embodiment of computer-memory complex 30 is described below in more detail.

Node controller 32 and cluster memory 34 are distinct and separate from computer-memory complex 30. Node controller 32 may cooperate with computer-memory complex 30 but, to some degree, operates independently of the same. That is, computer-memory complex 30 may program node controller 32. Node controller 32, as programmed, can then operate independently on data, thereby providing overall control for the transfer of data through node 22. Accordingly, computer-memory complex 30 is not burdened with the task of performing actual operations on the data. Cluster memory 34 is coupled to node controller 32 and, as described herein, generally functions to cache data and information being transferred through node 22. With cluster memory 34, data/information being transferred through node 22 does not have to be temporarily stored in computer-memory complex 30. Thus, by reducing the workload and responsibilities of computer-memory complex 30, node controller 32 and cluster memory 34 facilitate and optimize the transfer of data and information through node 22.

In one embodiment, transfers of data/information can occur directly between the cluster memories 34 on two nodes 22. The high bandwidth of communication paths 26 allows very efficient communication between nodes 22. Furthermore, these direct transfers between any two given nodes 22 can be under the control of one or both of the respective node controllers 32. Thus, such direct transfers do not consume any PCI bandwidth or CPU/memory bandwidth of any computer-memory complex 30.

This ability to let bulk data transfer bypass the general purpose computer-memory complex 30 is advantageous. It enables the transfer of data/information at tremendous bandwidth. Furthermore, because the computer-memory complex 30 complex is less loaded, it is more available to provide or support other functions, such as, for example, a HTTP service, a NFS service, and a CIFS service.

Exemplary Implementation for a Node

Figure 4:
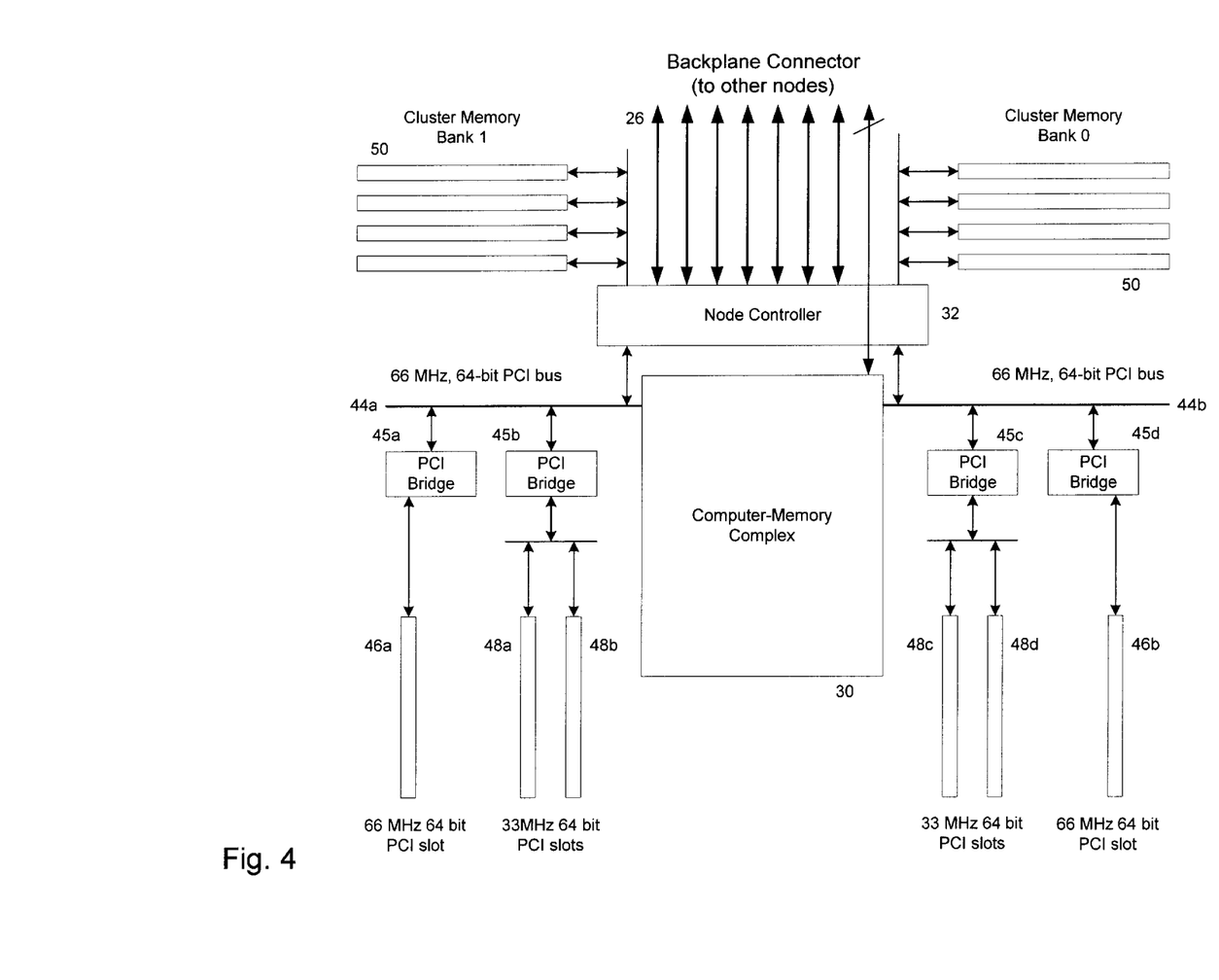
FIG. 4 illustrates an exemplary implementation for a node, according to an embodiment of the present invention.

FIG. 4 illustrates an exemplary implementation for a node 22, according to an embodiment of the present invention. Within this implementation, computer-memory complex 30 and node controller 32 may be implemented with one or more integrated circuit (IC) devices mounted on a suitable system board connected to other nodes 22 via a backplane.

As depicted, two peripheral component interconnect (PCI) buses 44 are supported by computer-memory complex 30. These PCI buses, which are separately labeled 44a and 44b, can each be a 66 MHz, 64-bit bus. A number of PCI bridges 45 are provided for each bus. As depicted, PCI bridges 45a and 45b are provided for PCI bus 44a, and PCI bridges 45c and 45d are provided for PCI bus 44b. PCI buses 44 and the respective PCI bridges 45 support one or more PCI slots to which a host device 12 or a storage device 20 can be connected. In this embodiment, each PCI bus 44 supports one 66 MHz, 64-bit PCI slot 46 and two 33 MHz, 64-bit PCI slots 48. Collectively, PCI buses 44, PCI bridges 45, and PCI slots 46 and 48 support or provide an implementation for connections 24 described with reference to FIGS. 2 and 3.

Node controller 32 resides on both PCI buses 44, and thus may transfer data/information to and from host devices 12 and storage devices 20 directly (i.e., without routing through computer-memory complex 30). One or more slots 50 connect node controller 32 to cluster memory. Although eight slots 50 are shown, for clarity only two of these slots 50 are labeled in FIG. 4. Each slot can hold a suitable memory device for implementing cluster memory.

Cluster memory may be implemented in banks which, as depicted, are separately labeled "Cluster Memory Bank 1" and "Cluster Memory Bank 0." In one embodiment, each bank may comprise a number of dual in-line memory modules (DIMMs), each DIMM held in a separate slot 50. Each DIMM can be a synchronous dynamic random access memory (SDRAM) of up to 1 GByte capacity. Thus, the total capacity for both banks of cluster memory in node 22 can be eight GBytes, and the total capacity for the cluster memory distributed in an interconnect component 16 having eight nodes is 64 GBytes.

The memory banks can be accessed with long bursts so that the sustainable bandwidth is quite close to the peak bandwidth. In one embodiment, each bank of cluster memory is eight bytes wide and operates at 133 MHz, thus resulting in a peak bandwidth of 1064 MBytes/s. The aggregate bandwidth of the two banks is approximately two GBytes/s.

Unlike the system memory in a general-purpose computer-memory complex, cluster memory is not limited to the bandwidth available on the system bus (e.g., a Pentium Pro bus). Rather, cluster memory can be accessed via multiple data paths that do not need to traverse the system bus. These data paths include the two PCI buses 44a and 44b, the communication paths 26, and internal XOR engine data paths. Since each 66 MHz, 64-bit PCI bus is capable of transferring about 500 MByte/s, the two PCI buses alone can contribute about 1 GByte/s of cluster memory bandwidth, which would exceed the achievable bandwidth on a system bus. Link transfers bring the cluster memory bandwidth even higher.

Computer-memory Complex

Figure 5:
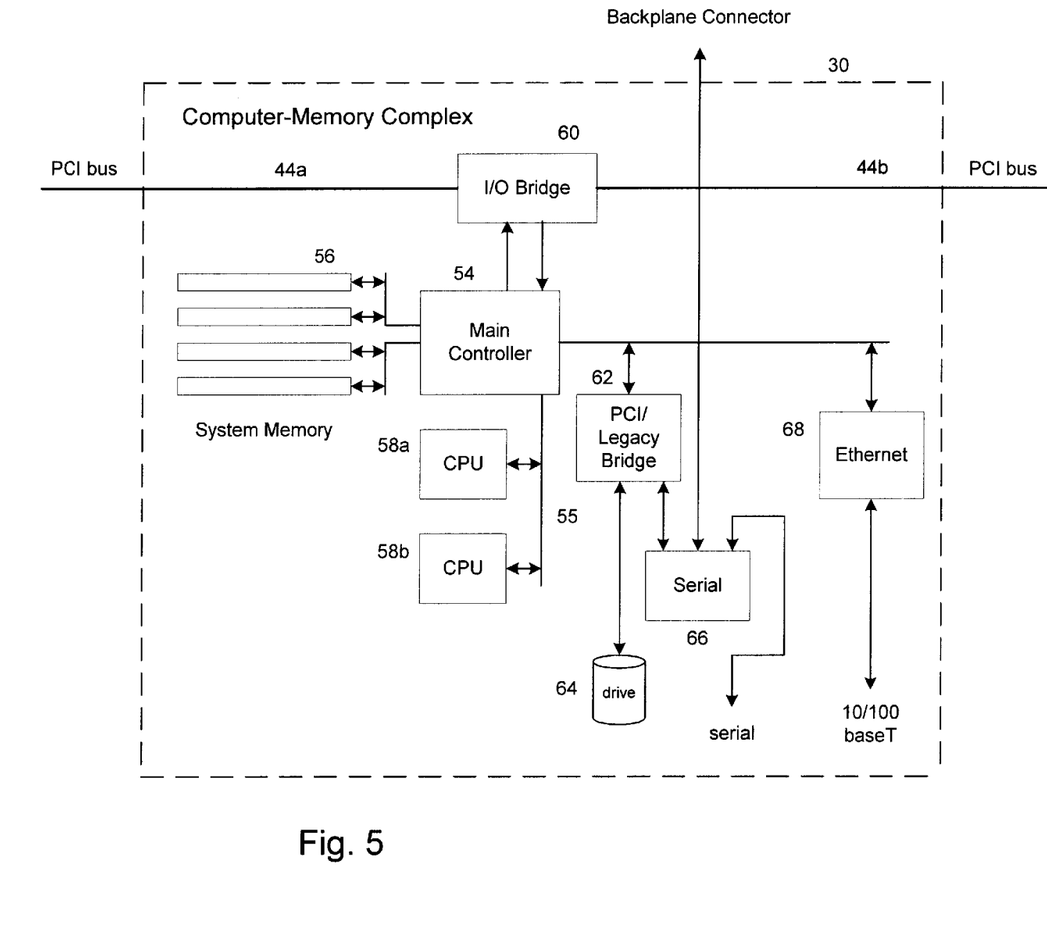
FIG. 5 illustrates an exemplary implementation for a computer-memory complex, according to an embodiment of the present invention.

FIG. 5 illustrates an exemplary implementation for computer-memory complex 30, according to an embodiment of the present invention. In general, computer-memory complex 30 can be implemented using a multi-processor capable chipset that provides a system memory controller, two PCI buses and a system bus for multiple processors. As shown, the chipset can include a main controller 54, an input/output (I/O) bridge 60, and a PCI/Legacy bridge 62. In one embodiment, main controller 54, I/O bridge 60, and PCI/Legacy bridge 62 can be implemented with a "Champ North Bridge," a "Champion Input/Output (I/O) Bridge (CIOB)," and a "South Bridge," respectively, all commercially available from ServerWorks. Other chipsets can also be used.

One or more central processing units (CPUs) 58, which are separately labeled 58a and 58b, generally provides processing capability for the control of data transfers through the node 22 on which computer-memory complex 30 is incorporated. Each CPU 58 can be implemented with any suitable processing device, such as, for example, a PENTIUM III by Intel Corporation.

Main controller 54 is connected to CPUs 58 via a CPU bus 55. Main controller 54 coordinates and manages the overall operation of computer-memory complex 30. Main controller 54 functions as a bridge between a CPU bus 55 and a bus for system memory.

One or more slots 56 connect main controller 54 to system memory. For clarity, only one slot 56 is labeled. Each slot 56 may hold a suitable memory device for implementing system memory. System memory can be implemented, for example, with synchronous dynamic random access memory (SDRAM). System memory generally functions to store data and information used in controlling transfers for the respective node 22. System memory is not required to cache data for bulk transfers through node 22 as this function can be performed by cluster memory 34 at the node.

I/O bridge 60, coupled to main controller 54, supports PCI buses 44, which are separately labeled 44a and 44b. In particular, I/O bridge 60 controls traffic of each PCI bus 44. I/O bridge 60 functions as a bridge between PCI buses 44 and main controller 54. Data transferred through the respective node 22 can be carried on PCI buses 44.

PCI/Legacy bridge 62 is coupled to main controller 54. PCI/Legacy bridge 62 generally functions as a bridge between PCI and industry standard architecture (ISA), integrated drive electronics (IDE), and other "legacy" interfaces on a PC platform. A local drive 64 is connected to PCI/Legacy bridge 62. Drive 64 can be used to boot the local operating system for computer-memory complex 30 and to back up local data from system memory in the event of a power failure.

A serial port 66 is connected to RCC south bridge 62. Serial port 66 generally functions to support a serial connection to and from computer-memory complex 30. This serial connection can be used as a secondary path between the respective node 22 and another node. The serial connection, which can be a slower-speed connection than a communication path 26, may function as a "heartbeat" connection between the two nodes 22.

In one embodiment, a separate serial port 66 is provided for every other node 22 in interconnect component 16. Thus, for an interconnect component 16 having eight nodes 22, the computer-memory complex 30 at any given node 22 may have seven serial ports 66 to provide a second path to each of the other seven nodes. The serial connections from a node 22 can be routed through a backplane to the other nodes. In addition to the separate serial ports 66 supporting connections with other nodes, one other serial port 66 can be provided for use as a diagnostic port into the respective node 22. This serial port 66 can be available through a panel connector. In one embodiment, each serial port 66 can be implemented as the same or separate suitable integrated circuit port device, such as, for example, an octal serial port chip.

The serial connections (provided by serial ports 66) and communication paths 26 provide redundant communication links between any two nodes 22. This redundancy addresses a problem generally known as a "split-brain" problem. The split-brain problem occurs in clustered systems in which a backup node is designed to take the place of a master node in the event that the master node fails. Typically, the master node and the backup node are joined by a single communication link. When this communication link is broken, the backup node infers (incorrectly) that the master node has failed and takes over the control functions of the master node. At the same time, the master node infers (incorrectly) that the backup node has failed and continues to perform the control functions. The dual operation of both the master node and the backup node performing the control functions can result in the corruption of data. Each communication link provided by serial ports 66 functions as "heartbeat" connection between two respective nodes 22. In the event that the communication path 26 between any two given nodes fails, the serial connection enables each of the two nodes 22 to check the "heartbeat" of the other node. That is, each node 22 is able query the other node in order to determine if the other node has failed. If the "heartbeat" connection indicates that a master node is still functioning properly, a backup node will not take over control functions. Thus, corruption of data due to the "split-brain" problem is avoided.

An Ethernet port 68, also coupled to main controller 54, supports an Ethernet connection with hardware external or remote to node 22. Ethernet port 68 can be implemented as a 10/100 Base-T Ethernet hub. In one embodiment, the Ethernet ports 68 of several nodes 22 can be connected to any given external hardware to provide redundancy in the management and control functions for that hardware. Accordingly, if one of these Ethernet ports 68 fails, the other Ethernet port 68 still provides management and control.

Node Controller

Figure 6:
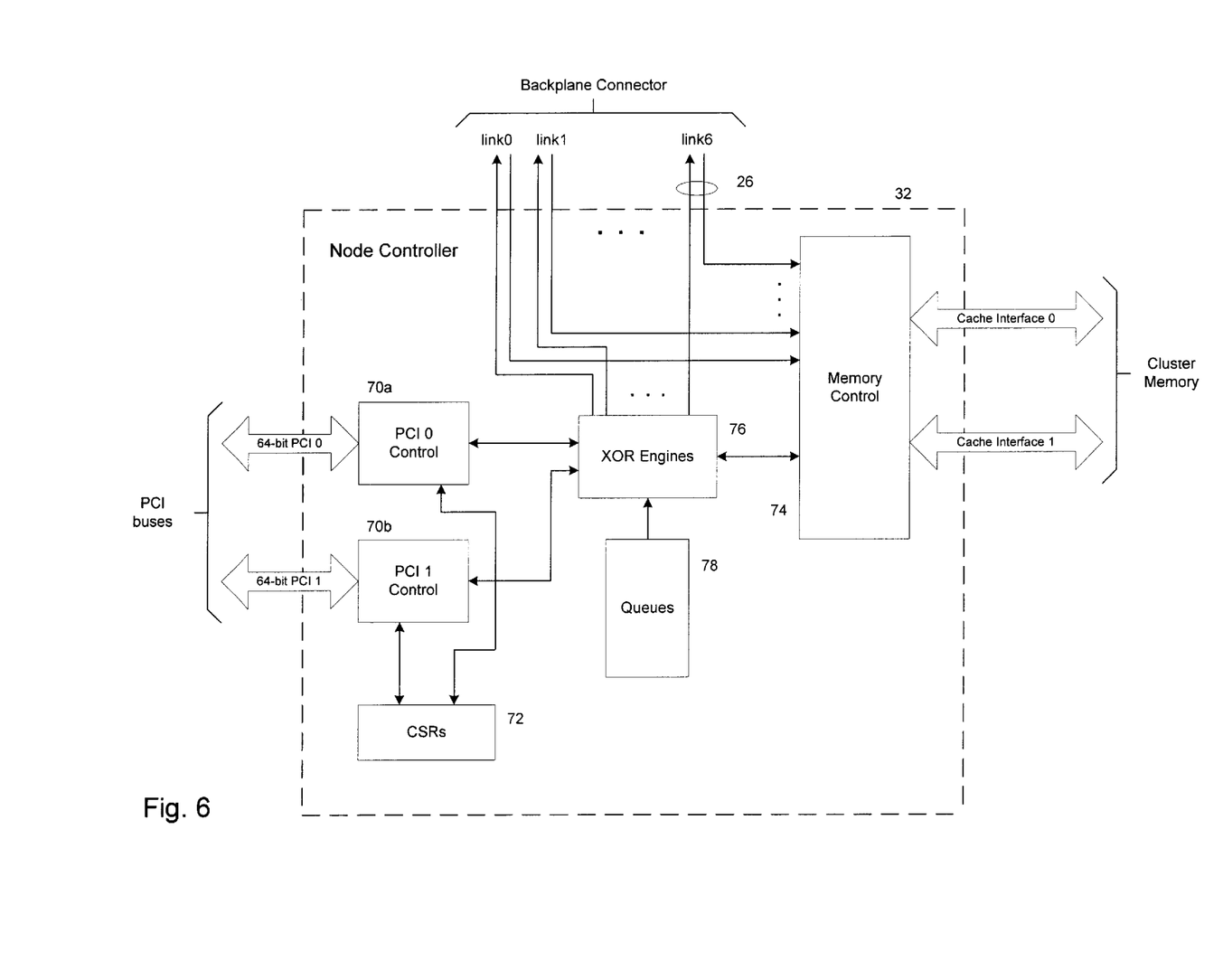
FIG. 6 illustrates an exemplary implementation for a node controller, according to an embodiment of the present invention.

FIG. 6 illustrates an exemplary implementation for a node controller 32, according to an embodiment of the present invention. In this implementation, node controller includes one or more PCI control interfaces 70, which are separately labeled 70a and 70b. Each PCI control interface 70 provides an interface with a respective PCI bus ("PCI 0" or "PCI 1"). Each such bus can be a 64-bit, 66 MHz bus. PCI control interfaces 70 allow node controller 32 to appear as a PCI device on each bus. Configuration software in the respective computer-memory complex 30 may view node controller 32 as separate and independent devices on the two PCI buses.

Control and status registers (CSRs) 72 are connected to each PCI control interface 70. Control and status registers 72 generally function to maintain or keep track of various information used in node controller 32. Thus, for example, control and status registers 72 may maintain the current values for flags or other control signals used in node controller 32. These may include interrupt, mask, and command signals. Also, control and status registers 72 may maintain base addresses for data. Other parts of node controller 32, as well as external PCI devices, may read or write into control and status registers 72.

Node controller 32 may act as a slave device (target), thus allowing other devices on each PCI bus (e.g., host devices 12 or the CPUs of computer-memory complex 30) to read from or write to cluster memory 34. PCI devices may also read or write the control and status registers 72.

A memory control 74 generally functions to provide or support an interface for cluster memory 34 of the respective node 22 and/or a remote node. In one embodiment, memory control 74 supports two 72-bit, 133 MHz SDRAM channels (0 and 1) for the local cluster memory 34 and communication paths 26 extending out to the cluster memories of other nodes.

As depicted, each communication path 26 may comprise two separate interconnect links. For each such pair of links, one link carries data/information out of node controller 32 to the respective node 22, and the other link carries data/information from the same node 22 into node controller 32 (particularly, memory control 74). The interconnect links as used in pairs thus form a fully-connected crossbar for the nodes 22 of interconnect component 16. In one embodiment, the links are eighteen bits wide and run nominally at 133 MHz. If data is sampled on both edges of a clock, the data rate is 532 MB/s for each link.

Cluster memory 34 may be programmed or divided into multiple regions. Each region may be, for example, a line of sixty-four bytes, and can be associated with a remote node 22. Node controller 32 may be configured so that the writing of data into a particular region of cluster memory 34 causes the same data to be sent to the associated remote node 22 via the respective interconnect link. Accordingly, the data is "mirrored" at the cluster memory 34 of the remote node. Node controller 32 may also be configured so that the writing of data to other regions causes the same data to be "broadcast" throughout interconnect component 16—i.e., the data is sent over every outgoing interconnect link to the respective remote nodes 22.

In one embodiment, when a data word (e.g., two bytes) is written into a region of memory, that word alone is not sent to the remote node. Instead the existing data of the entire region (e.g., a memory line of sixty-four bytes) is read from memory, the new data for the word is merged into the existing data, and the merged data is written back to the memory region and also sent over a communication path 26 to the remote node. This mechanism allows very low overhead communication between nodes 22.

One or more "exclusive OR" (XOR) engines 76 are coupled to PCI control interfaces 70, memory control 74, and the outgoing interconnect links of communication paths 26. XOR engines 76 may support a redundant array of inexpensive disks (RAID) configuration. Specifically, XOR engines 76 may compute RAID parity when initializing a RAID volume or writing a full RAID strip, reconstruct data when one disk in a RAID group is bad, and compute new RAID parity from old parity read from disk and partial parity received over the interconnect link from another node. XOR engines 76 may perform other types of operations, such as, for example, checksums. Checksums are codes that can be used to ensure that data is valid.

In one embodiment, XOR engines 76 can read multiple regions of local cluster memory 34, perform an XOR operation on all of the regions, and write the result back to another region of local cluster memory 34. This is used to accelerate the writing of a full RAID strip and to speed up reconstruction of data after disk failure in a RAID group. A separate XOR engine 76 may provided for each interconnect link. Each such XOR engine 76 can perform an XOR operation on two regions of local cluster memory 34 and place the result into the cluster memory at a remote node 22. This is used in writing of a RAID partial strip to compute the new parity. Each link XOR engine 76 can also be used to copy a region of local cluster memory 34 into a remote node's cluster memory.

In one embodiment, XOR engines 76 may implement a Direct Memory Access (DMA) engine to move data between system memory and the local cluster memory 34. Specifically, the XOR engines 76 can be used to read data from system memory over the PCI buses and to write data to system memory over the PCI buses. The CPUs in computer-memory complex 30 may use this DMA engine to implement a file system over a raw volume of data storage.

One or more queues 78 are connected to XOR engines 76. Queues 78 store command blocks which can be processed by XOR engines 76. Each command block may specify a number of sources upon which an XOR operation can be performed, and the result sent to particular destination. Each source can be a region of cluster memory 34 or PCI buses 44. The destination can be one of the outgoing interconnect links, a PCI bus, or a region of cluster memory. A separate command queue 78 may be provided for each destination.

With the functionality described herein, node controller 32 accelerates the storage of data/information and communication through node 28, thereby enhancing performance and availability.

Exemplary Hardware Implementation for Interconnect Component

Figure 7:
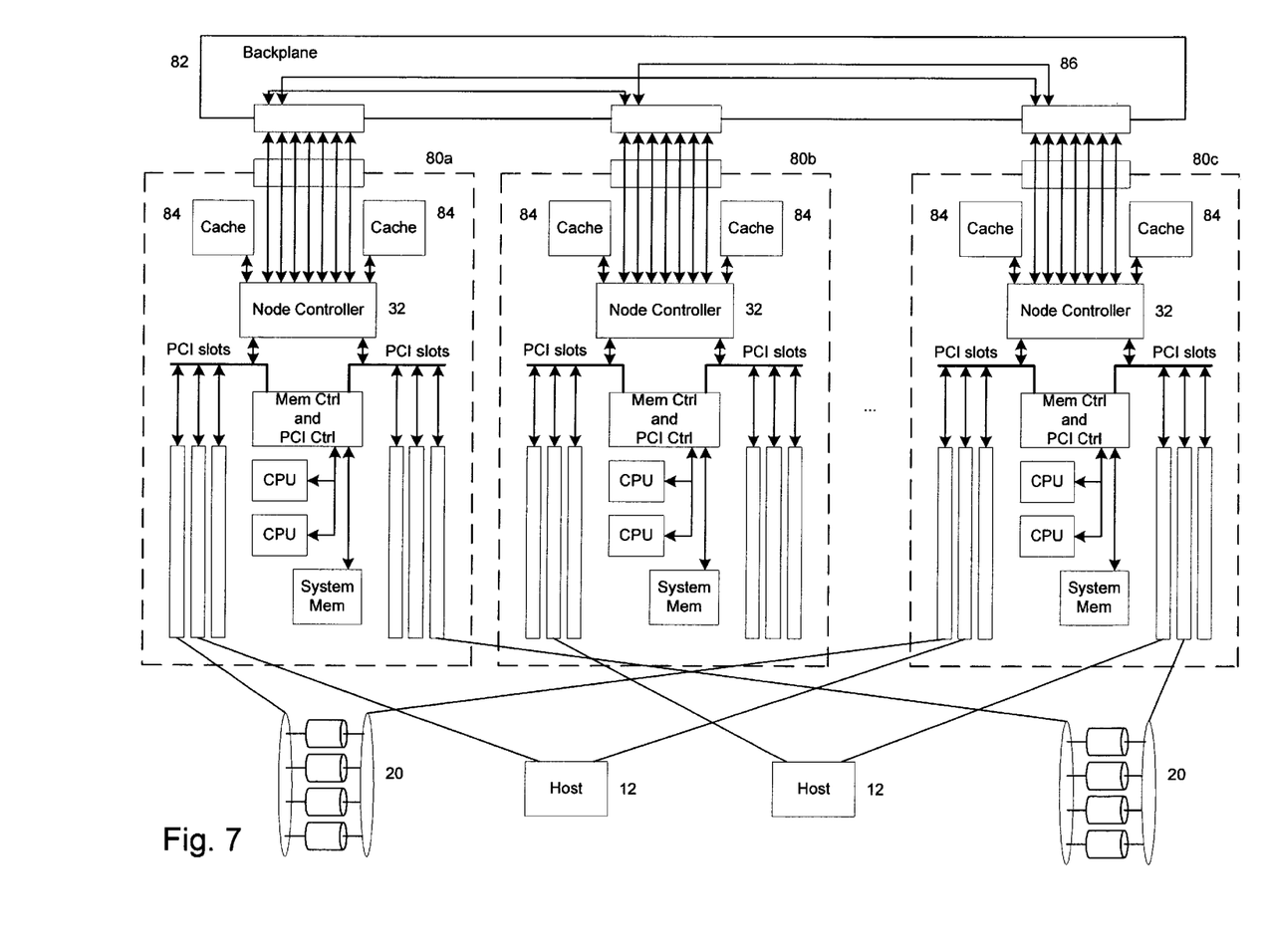
FIG. 7 illustrates a plurality of nodes, each of which is implemented in one hardware configuration, according to an embodiment of the present invention.

FIG. 7 illustrate an exemplary implementation for interconnect component 16, according to an embodiment of the present invention. In this implementation, each node 22 can be implemented with a separate system board 80. A backplane 82 connects the system boards 80 together.

As depicted, system boards are separately labeled 80a, 80b, and 80c. In one embodiment, eight system boards 80 may be included in an interconnect component 16. Each system board 80 is a separate computer system with one or more CPUs, system memory, PCI buses, and PCI slots that may be implemented using standard, off-the-shelf components. The PCI slots provide connection for host devices 12 or storage devices 20. As depicted, each host device 12 and storage device 20 may be connected to the PCI slots of more than one system board 80. This provides redundancy so that in the event one system board 80 crashes, the host devices 12 and storage devices 20 connected to that system board 80 are still able to send/receive data or information via the respective back-up system boards 80.

Each system board 80 may include its own node controller 30, which shares the respective PCI buses with the PCI slots. Node controllers 30 can each be implemented as an application specific integrated circuit (ASIC). Each node controller 30 supports a number of interconnect links that are connected via backplane 82 to other system boards 80. Each node controller 30 may control accesses (i.e., reads or writes) into two banks of cluster memory, which can be implemented as cache memory 84. Via a node controller 30, a CPU or other device (e.g., PCI master) on the respective system board 80 can directly read or write to locations or regions of local cluster memory. For example, a PCI fibre channel arbitrated loop (FCAL) controller can perform Direct Memory Access (DMA) to and from the cache memory 84 on local system board 80.

Node controllers 30 on different system boards 80 may communicate to transfer data/information therebetween, for example, in bulk transfers. Node controllers 30 can perform peer-to-peer transfers—i.e., transfers between two PCI devices other than the main computer system comprising CPUs and system memory (i.e., computer-memory complex). This is advantageous for a number of reasons. Because node controllers 30 primarily handle the peer-to-peer transfers, the main computer systems in each system board 80 are made more available for other functions. At the same time, "normal" PCI bus transfers to the main computer systems can be used for control information without requiring separate buses. Furthermore, bulk transfers of data avoid the limitations of a typically main computer system, such as, for example, relatively narrow bandwidth on system buses and limited capacity system memory. In interconnect component 16, because bulk data transfers are carried out using the large capacity, relatively wide cluster memory and over high-speed links, transfers between nodes 22 can be very fast. Since cluster memory is separately provided for each node controller 32, no additional transfer is required to transport data to another node controller at a different node. These optimize the efficiency and performance of the interconnect component 16, and thus, enhances the overall operation of data storage system 10.

Backplane 82 includes a number of slots for holding system boards 80. Backplane 82 supports communication paths 26 for interconnecting nodes 22. Each communication path 26 may be implemented as a pair of high-speed links 86 (one in each direction) connecting two system boards 80. In one embodiment, a separate pair of high-speed links 86 is provided for each two system boards 80 of data interconnect component 16. As such, backplane 82 provides a fully connected crossbar for interconnecting system boards 80. The crossbar allows excellent scalability up to a reasonably large system size without adding latency.

Interconnect component 16 may be scaled beyond the data transfer capacity of the system boards 80 which can mechanically fit on backplane 82. In particular, one or more of system boards 80 can serve as a switch with connections to other backplanes 82, thereby expanding capacity to include that provided by additional system boards 80.

Impact of Node Failure

Figure 8:
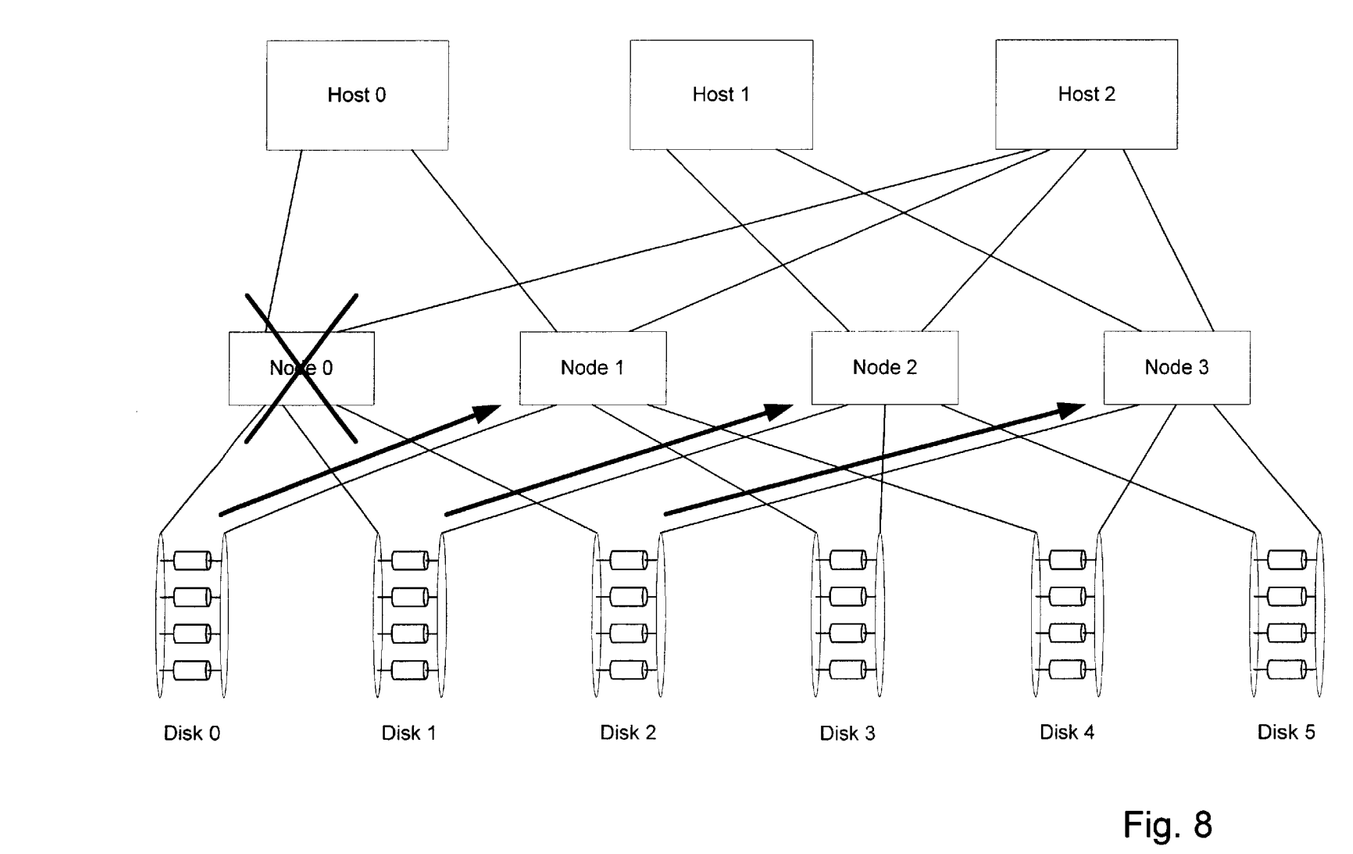
FIG. 8 illustrates the impact of a node failure, according to an embodiment of the present invention.

FIG. 8 illustrates the impact of a node failure, according to an embodiment of the present invention. As depicted, a number of nodes 22—separately referred to as "Node 0," "Node 1," "Node 2," and "Node 3"—connect to various host devices 12 and storage devices 20.

Host devices 12 are separately referred to as "Host 0," "Host 1," and "Host 2." Each host device 12 is connected to two or more nodes. In particular, as shown, Host 0 is connected to Node 0 and Node 1. Host 1 is connected to Node 2 and Node 3. Host 2 is connected to Node 0, Node 1, Node 2, and Node 3.

Storage devices 20 are separately referred to as "Disk 0," "Disk 1," "Disk 2," "Disk 3," "Disk 4," and "Disk 5." Each storage device 20 is connected to two or more nodes. In particular, as shown, Disk 0 is connected to Node 0 and Node 1. Disk 1 is connected to Node 0 and Node 2. Disk 2 is connected to Node 0 and Node 3. Disk 3 is connected to Node 1 and Node 2. Disk 4 is connected to Node 1 and Node 3. Disk 5 is connected to Node 2 and Node 3.

Each host device 12 and each storage device 20 may have a primary node and a secondary node. In normal operation, in one embodiment, the primary node performs all accesses to the respective host/storage device; the secondary node takes over only if the primary node fails. In an alternative embodiment, the primary node and the secondary node are simultaneously active to perform accesses.

In the arrangement depicted in FIG. 8, the nodes 22 could be paired so that each of Node 0 and Node 1 takes over control of the other node's storage devices 20 in the event of failure of the other node. Likewise, Node 2 and Node 3 could be paired so that each of these nodes takes over control of the other node's storage devices in the event of failure. With such pairings, if a particular node fails, the load of its associated node would double, and thus would very likely be a bottleneck in data storage system 10. This doubling of load is unavoidable in a system with only two nodes.

In an embodiment of the present invention, however, more than two nodes are provided. In the event, that one node fails, the load of that node can be more evenly distributed across the surviving nodes. Thus, for example, if Node 0 fails, then each of Node 1, Node 2, and Node 3 may take over control of some portion of the storage devices assigned to Node 0. In particular, Node 1 takes over control of Disk 0, Node 2 takes over control of Disk 1, and Node 3 takes over control of Disk 2. Because the work load of the failed node is evenly distributed among the other nodes, none of the remaining nodes will act as a bottleneck in the system.

Accordingly, an embodiment of the present invention provides a high performance, scalable, flexible, cost-effective data storage system and architecture comprising a number of nodes interconnected by a plurality of communication paths. Each node may a general purpose computer-memory complexes, a node controller, a cluster memory which can be used as cache storage, and a number of connections to host devices and storage devices which request and store data. This data storage system and architecture is highly available because any node can fail without resultant data loss since another node can take its place. Many components can be added or replaced without affecting the operation of the rest of the data storage system. The data storage system also provides high performance because each node and communication path has sufficient bandwidth to sustain very high throughput. Because each node has its own separate cluster memory for cache, data transfers are facilitated. The data storage system is scalable because each node may be implemented with a system board which is readily added into a backplane connector interconnecting other system boards.

Although particular embodiments of the present invention have been shown and described, it will be obvious to those skilled in the art that changes or modifications may be made without departing from the present invention in its broader aspects, and therefore, the appended claims are to encompass within their scope all such changes and modifications that fall within the true scope of the present invention.

What is claimed is:

1. A data storage system comprising:
   a plurality of storage devices;
   a plurality of nodes for providing access to the storage devices, each node comprising:
      a computer-memory complex operable to provide general purpose computing for the node,
      a node controller operable to control data transfers through the respective node, and
      a cluster memory coupled to the node controller, the cluster memory operable to buffer data for the data transfers;
   a plurality of storage device-to-node communication paths for connecting the storage devices to the nodes, wherein each storage device is coupled by two independent storage device-to-node communication paths to two of the nodes; and
   a plurality of primary node-to-node communication paths for interconnecting the nodes, wherein each node is coupled by independent primary node-to-node communication paths to all the other nodes.

2. The data storage system of claim 1 wherein the computer memory complex is operable to support an input/output bus for transferring data and control through the node.

3. The node of claim 2 wherein the input/output bus comprises a peripheral component interface bus.

4. The node of claim 3 wherein the node controller is connected as a peripheral component interface device on the peripheral component interface bus.

5. The node of claim 2 wherein the node controller is connected to the input/output bus.

6. The data storage system of claim 1 further comprising a plurality of secondary node-to-node communication paths for interconnecting the nodes, wherein each node is also coupled by independent secondary node-to-node communication paths to all the other nodes.

7. The data storage system of claim 6 wherein each secondary node-to-node communication path supports a heartbeat connection for the respective two nodes.

8. The data storage system of claim 1 wherein the data buffered in the cluster memory of one node is automatically mirrored in the cluster memory of another node.

9. The data storage system of claim 1 wherein control of the primary node-to-node communication paths is distributed among the node controllers.

10. The data storage system of claim 1 wherein each node comprises a slot for connecting to the storage device or a host device.

11. The data storage system of claim 1 wherein each node is implemented as a system board.

12. The data storage system of claim 11 wherein the system boards are connected by a backplane including the primary and the secondary node-to-node paths.

13. The node of claim 1 wherein the cluster memory comprises a synchronous dynamic random access memory.

14. The node of claim 1 wherein the computer-memory complex comprises:
   a central processing unit; and
   system memory.

15. The node of claim 1 wherein the node controller comprises:
   a logic engine; and
   a memory control.

16. The data storage system of claim 1 wherein the node controller is operable to compute RAID parity.

17. The data storage system of claim 1 wherein the node controller is operable to reconstruct data if a storage device of the data storage facility is not operating properly.

18. The data storage system of claim 1 wherein the node controller is operable to perform a checksum operation to validate data being transferred through the node.

19. The data storage system of claim 1 wherein the node controller is operable to accelerate writing of a full RAID strip.

20. The data storage system of claim 1 wherein the node controller is operable to perform peer-to-peer transfer of data through the node.

21. The data storage system of claim 1 wherein the node controller is operable to compute RAID parity.

22. The data storage system of claim 1 wherein the node controller is operable to reconstruct data if a storage device of the data storage facility is not operating properly.

23. The data storage system of claim 1 wherein the node controller is operable to perform a checksum operation to validate data being transferred through the node.

24. The data storage system of claim 1 wherein the node controller is operable to accelerate writing of a full RAID strip.

25. The data storage system of claim 1, further comprising:
   a plurality of host devices accessing the storage devices through the nodes; and
   a plurality of host device-to-node communication paths for connecting the host devices to the nodes, wherein each host device is coupled by two independent host device-to-node communication paths to two of the nodes.

26. The data storage system of claim 25, wherein each node further comprises a bus coupled to the computer memory complex, the bus comprising:
   a slot for receiving the controller node; and
   a plurality of slots, each of the plurality of slots receiving a storage device or a host device.

27. A data storage system comprising:
   a plurality of storage devices;
   a plurality of system boards for providing access to the storage devices, each system board comprising:
      a bus including an interface slot operable to connect the system board to one of the storage devices, wherein each storage device is coupled independently to two of the system boards,
      a computer-memory complex operable to provide general purpose computing for the system board,
      a node controller coupled to the computer-memory complex, the node controller operable to control data transfers through the system board, and
      a cache memory coupled to the node controller, the cache memory operable to buffer data for the data transfers; and
   a backplane for interconnecting the system boards, the backplane supporting a plurality of primary system board-to-system board communication paths for transfer of data between the system boards, wherein each system board is coupled by independent primary system board-to-system board communication paths to all the other system boards.

28. The data storage system of claim 27 wherein each node controller comprises an application specific integrated circuit.

29. The data storage system of claim 27 wherein the cache memory comprises a dual in-line memory module.

30. The data storage system of claim 27 wherein the computer-memory complex comprises:
   a central processing unit; and
   system memory.

31. The data storage system of claim 27 further comprising a plurality of secondary system board-to-system board communication paths, wherein each system board is coupled by independent secondary system board-to-system board communication paths to all the other system boards.

32. The data storage system of claim 27, further comprising:
   a plurality of host devices accessing the storage devices through the system boards;
   wherein the bus of each system board further includes a second interface slot operable to connect the system board to a host devices, each host device being coupled independently to two of the system boards.

* * * * *